United States Patent
Hasara et al.

(10) Patent No.: US 11,047,458 B1
(45) Date of Patent: Jun. 29, 2021

(54) LOAD-ADJUSTABLE CONSTANT-FORCE MECHANISMS

(71) Applicants: Steven Lawrence Hasara, Bradenton, FL (US); Craig Perry Lusk, Lutz, FL (US)

(72) Inventors: Steven Lawrence Hasara, Bradenton, FL (US); Craig Perry Lusk, Lutz, FL (US)

(73) Assignee: University of South Florida, Tampa, FL (US)

( * ) Notice: Subject to any disclaimer, the term of this patent is extended or adjusted under 35 U.S.C. 154(b) by 84 days.

(21) Appl. No.: 16/661,465

(22) Filed: Oct. 23, 2019

Related U.S. Application Data

(63) Continuation of application No. 15/679,245, filed on Aug. 17, 2017, now Pat. No. 10,508,721.

(60) Provisional application No. 62/376,177, filed on Aug. 17, 2016.

(51) Int. Cl.
*F16H 21/44* (2006.01)
*B25J 17/02* (2006.01)

(52) U.S. Cl.
CPC .......... *F16H 21/44* (2013.01); *B25J 17/0208* (2013.01)

(58) Field of Classification Search
CPC .............................. F16H 21/44; B25J 17/0208
See application file for complete search history.

(56) References Cited

U.S. PATENT DOCUMENTS

| | | | | |
|---|---|---|---|---|
| 5,649,454 A | * | 7/1997 | Midha | F16H 21/44 267/160 |
| 7,874,223 B2 | | 1/2011 | Sugar et al. | |
| 10,330,144 B1 | * | 6/2019 | Alqasimi | F16C 7/06 |
| 10,508,721 B1 | * | 12/2019 | Hasara | F16H 21/44 |
| 10,934,771 B2 | * | 3/2021 | Bohlen | E06B 9/323 |
| 2020/0324411 A1 | * | 10/2020 | Li | A63H 11/20 |

OTHER PUBLICATIONS

Boyle et al., Dynamic Modeling of Compliant Constant-Force Compression Mechanisms, (2003). All Faculty Publications, Brigham Young University. Paper 465, pp. 1-24.

Weight, Development and Design of Constant-Force Mechanisms, (2002). All Theses and Dissertations, 3, Brigham Young University, pp. 1-255.

\* cited by examiner

*Primary Examiner* — Terence Boes
(74) *Attorney, Agent, or Firm* — Nicholas Pfeifer; Smith & Hopen, P. A.

(57) ABSTRACT

A compliant crank slider with adjustable constant-force output. Constant-force mechanisms (CFM) are used to maintain a constant output reaction force throughout a large range of compressive motion. The invention improves on existing CFM by introducing a second degree of freedom that adjusts the mechanism's output without changing its kinematic structure. This second degree of freedom is the rotation of a compliant beam about its longitudinal axis as it is constrained to the initial plane of bending. In an embodiment, the second degree of freedom is the rotation of both a first compliant beam and a second compliant beam. The resulting change in the constant force mechanism allows for adjustment to a specifiable range of constant-force outputs.

20 Claims, 4 Drawing Sheets

LOAD-ADJUSTABLE CONSTANT-FORCE MECHANISMS

CROSS-REFERENCE TO RELATED APPLICATIONS

This nonprovisional application is a continuation of and claims priority to, U.S. Non-Provisional patent application Ser. No. 15/679,245, entitled "Load-Adjustable Constant Force Mechanisms," filed Aug. 17, 2017 by the same inventors, which claims priority to U.S. Provisional Patent Application No. 62/376,177, entitled "Load-Adjustable Constant-Force Mechanisms", filed Aug. 17, 2016 by the same inventors, the entirety of which is incorporated herein by reference.

FEDERALLY SPONSORED RESEARCH OR DEVELOPMENT

This invention was made with Government support under Grant No. CMMI-1000138 awarded by the National Science Foundation. The government has certain rights in the invention.

BACKGROUND OF THE INVENTION

1. Field of the Invention

This invention relates to compliant mechanisms. More specifically, it relates to compliant constant-force mechanisms.

2. Brief Description of the Related Art

Compliant Mechanisms

A compliant mechanism is a flexible mechanism that derives some or all its motion (mobility) from the deflection of flexible segments, thereby replacing the need for mechanical joints. It transfers an input force or displacement from one point to another through elastic body deformation. The absence or reduction of mechanical joints impacts both performance and cost. Advantages include reduced friction and wear, increased reliability and precision, and decreased maintenance and weight. Moreover, the cost is also affected by reduced assembly time and, in most cases, due to its hingeless design, the fabrication of such mechanisms can be produced from a single piece. Additionally, compliant mechanisms provide the designer with an effective way to achieve mechanical stability.

These mechanisms are most commonly designed in two ways. One is using pseudo-rigid-body models, and the other is using topology optimization. Both approaches have utility. The design of the compliant portion of the unit cell components is accomplished through compliant mechanism synthesis.

There are three major approaches to the design and synthesis of compliant mechanisms: kinematic approximation methods, computationally intense methods, and linear and higher-order expansions of the governing equations. This disclosure is based primarily upon kinematic approximation methods.

The kinematic approximation or Pseudo-Rigid-Body Model (PRBM) approach works by identifying similarities between compliant mechanisms and rigid-body mechanisms. It has proved effective in identifying numerous compliant analogs to ubiquitous planar rigid-body mechanisms such as four-bar and crank-slider mechanisms. The chief criticisms of this approach are that the models are approximate and have limited, albeit known, accuracy. Moreover, the identification between flexure geometries and rigid-body mechanisms has been limited to a small but versatile set of planar configurations.

Computationally intense approaches typically combine finite element analysis with optimization to calculate optimal geometries in response to load and motion specifications. This approach has been successful but has also been criticized for producing results identical to those produced more quickly by the PRBM approach, or results that are not physically realizable. As a general rule, this approach is more capable and accurate than the PRBM approach, but also more time-consuming.

The third approach, which relies on linear and higher-order expansions of the governing equations, is well-known in precision mechanisms research and relies heavily on flexures that are small and undergo small, nearly linear, deflections. This approach uses flexures much smaller than the overall mechanism size, so it is not generally applicable to millimeter-scale and smaller mechanisms. These techniques are important but do not have a direct bearing on the invention disclosed herein.

Constant-Force Mechanisms

Constant-force mechanisms (CFM) already exist in the form of springs, rigid-body mechanisms, and in the form of compliant mechanisms (i.e., flexible devices which transmit force or displacement by means of elastic deformation). An example of use of CFMs is in robotic end effectors. A typical robotic arm has no real way of controlling the amount of contact pressure it applies. By adding a constant-force end effector, the arm only needs to operate within a certain range of motion to maintain the desired force output. For example, the result can be observed in a glass-cutting robot. With a CFM in place, its end-effector could have a high positional error allowance and still apply the correct amount of force to cut the glass without breaking it. The limitation is that these devices must be designed around their intended force output, and as such, an issue arises with how the same robot would be able to cut several thicknesses of glass.

In the conventional art, constant-force compliant mechanisms with constant stiffness are mechanisms that allow for substantial decoupling of force and linear displacement in robotic systems. In other words, the same force is transmitted regardless of the position of the mechanism; this is quite restrictive. Accordingly, what is needed is a system capable of varying the stiffness of these compliant CFMs. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a load-adjustable constant-force mechanism is now met by a new, useful, and nonobvious invention.

In an embodiment, the current invention is a constant-force mechanism that has a second degree of freedom that adjusts the output force without changing a kinematic structure of the mechanism. This second degree of freedom is the rotation of a beam about a longitudinal axis thereof constrained to an initial plane of bending.

In a separate embodiment, the current invention is a compliant, load-adjustable constant-force crank-slider mechanism. The mechanism includes a compliant beam (e.g., cross-section having an aspect ratio of about 2:1) formed of a first link and a second link, both of which are optionally flexible, where the first link extends away from a base. Each link has two ends. One end of the first link is linearly fixed. A torsional spring is disposed at the fixed end of the first link, such that the first link is rotatable about the spring. The torsional spring is biased toward a stable position and upon being unstable, outputs a constant force to return to the stable position. For example, if this stable position is a state of expansion when the mechanism undergoes compression, the constant force is outputted to expand the mechanism. In an embodiment, an angle of elastic deflection of the first link may increase as the mechanism compresses, and vice versa.

The non-fixed end of the first link and an end of the second link are coupled together by a joint (e.g., pin connection) disposed therebetween at a predetermined distance away from the base. The links are rotatable relative to each other about the joint. A slider is positioned at the opposite end of the second link. The slider traverses along an x-axis during compression and expansion of the spring. The beam is rotatable (e.g., freely rotatable) about its longitudinal axis, such that beam rotation alters the constant force that the spring outputs to return to its stable position. Optionally, to actuate beam rotation, a stepper motor or a compliant ratchet system may be used. In any case, even with this beam rotation, the crank-slider mechanism would be constrained to its initial axis of bending.

In a separate embodiment, the current invention is a compliant, load-adjustable constant-force crank-slider mechanism, including any one or more—or even all—of the foregoing characteristics and features.

It is an object of the current invention to perform the same function of a conventional CFM but also allows for an adjustable output. This is accomplished by rotating the flexible member of a compliant constant-force slider about its longitudinal axis. By constraining the compliant beam to always bend in the same plane, its stiffness changes as a result of its rotation. This allows the force output of the device to be adjusted as a function of the rotation of the compliant beam.

The present invention provides precise force output control independent of position. The robot-environment relationship requires force control for normal behavior and unexpected collisions. Stiff actuators are effective for precise positional control but are ineffective for force control. Therefore, it is favorable that the elasticity of this system transforms a problem of force control into one of positional control.

Closing the control loop with positional feedback also enables dynamic adjustability. CFMs are zero-stiffness devices, but dynamic load adjustment as a function of position would allow for tuning of stiffness up or down from zero. By adding positional feedback control to a system with innate force control, position can be set and maintained as a function of applied load. The substantial decoupling of force and displacement is beneficial because it means that the stiffness of the mechanism is subject to digital control.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

As used herein, "about" means approximately or nearly and in the context of a numerical value or range set forth means±15% of the numerical. In an embodiment, the term "about" can include traditional rounding according to significant figures of the numerical value. In addition, the phrase "about 'x' to 'y'" includes "about 'x' to about 'y'".

Figure 1:
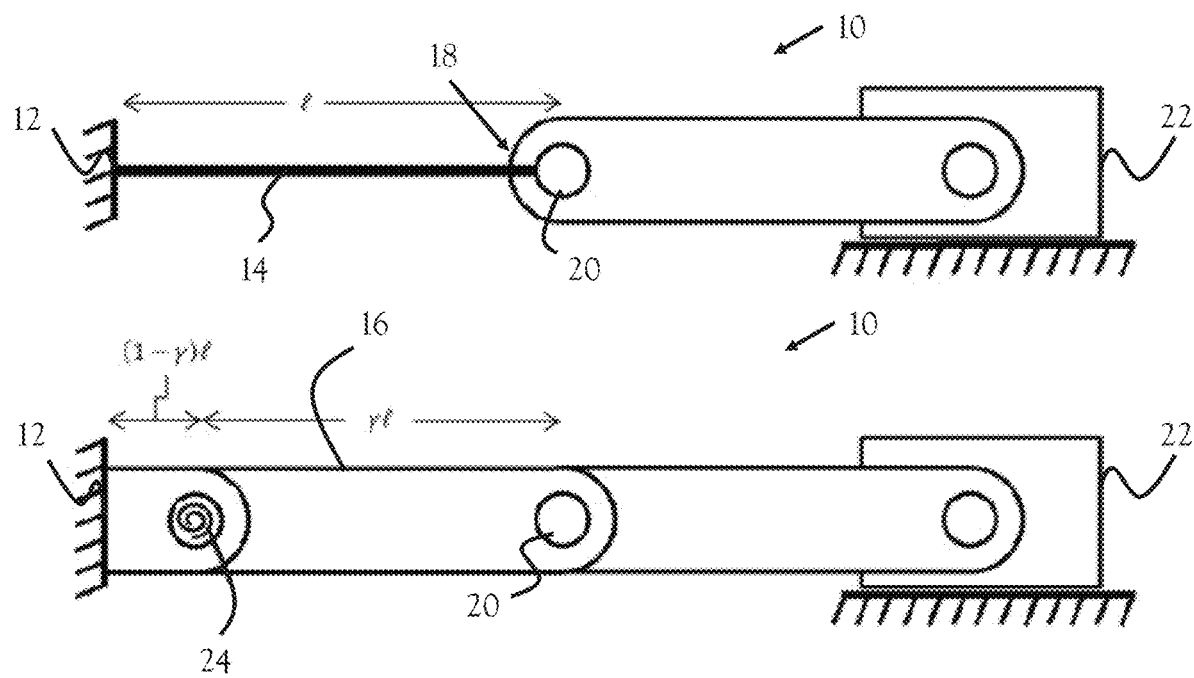
FIG. 1 depicts an embodiment of a compliant constant-force slider and its equivalent pseudo-rigid body model.

A beam's stiffness is its resistance to bending deformation. In the case of compliant mechanisms, this bending is idealized as purely elastic and is a function of two properties—elastic modulus and second moment of area. To demonstrate, CFM in its simplest form exists in a compliant crank slider. It implements link proportions that produce a roughly constant-force output. This was achieved by substituting one or more compliant beams into a traditional crank slider. The particular configuration that the present invention emulates is depicted in FIG. 1.

Pseudo-Rigid Body Model (PRBM)

The PRBM treats a beam in pure bending as two rigid links with a torsional spring at their joint/pin connection. A fixed-free beam bends very little at the end furthest away from its base. As shown in FIG. 1, base 12 is modeled as an extension of the ground, and the deflecting portion of beam 14 is modeled as a rigid link 16 that is pinned to the base 12. This results in a circular path for beam tip 18, which is not exactly accurate, but it is close enough to be a viable approach. A small amount of error may be acceptable to simplify the analysis of compliant mechanisms 10.

A new parameter is defined for this model, specifically how far along beam 14 to position pin connection 20. This length is defined by $\gamma$. A standard value of $\gamma=0.83$ signifies that 83% of compliant beam's 14 length is treated as rotating about a fixed point that is located 17% of the beam's length away from its fixed boundary.

The input motion of the above compliant slider mechanism 10 is assumed to be slider 22 deflection, $\Delta x$, so that $r_1 = r_2 + r_3 - \Delta x$. As mechanism 10 is compressed, the angle of elastic deflection $\theta_2$ will increase.

Torsional spring 24 $k_1$ describes the energy stored in beam 14 as it is deformed elastically, where:

$$k_1 = \gamma K_\theta \frac{EI\theta_2}{l}. \tag{1}$$

Each term in Equation 1 has been discussed except for $K_\theta$, which is a non-dimensional stiffness coefficient approximated as $\gamma\pi$. The output of mechanism 10 is the reaction force on slider 22, which is assumed to move in line with the fixed end of compliant beam 14.

Virtual Work

Real-world application of this model considers partial weight and center of gravity.

Virtual work analysis accounts for only the components of force and moment that affect the ultimate output.

In analyzing each contribution to the total force output of mechanism 10, two orientations were defined for the device—horizontal orientation and vertical orientation. Changing the direction of gravity could affect behavior enough to require two separate models.

Figure 2:
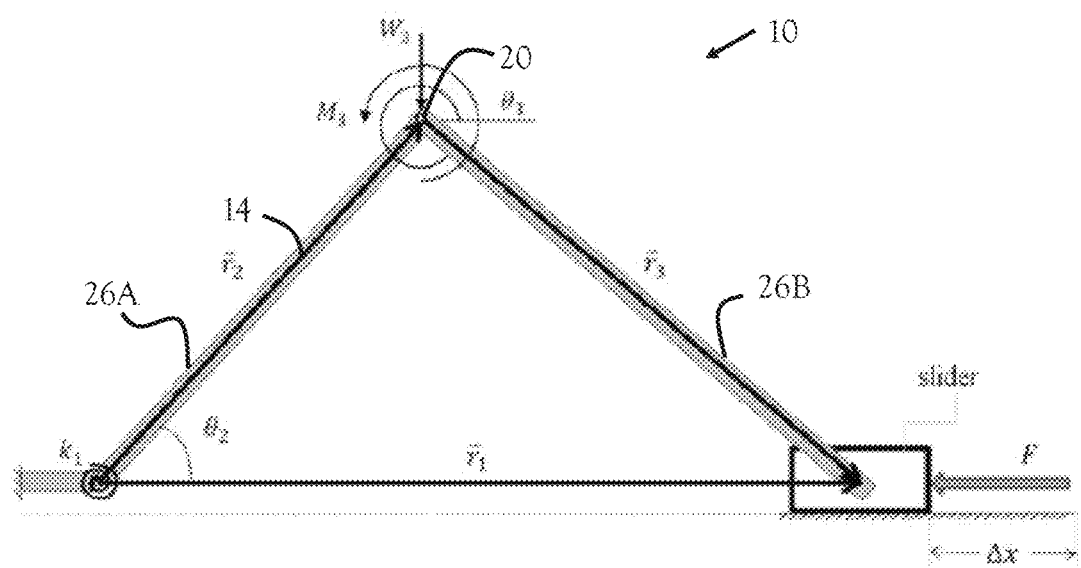
FIG. 2 depicts a pseudo-rigid body model of the compliant crank slider depicted in FIG. 1.

In each model, the mass of the pin connection between $r_2$ and $r_3$ dominates any divergence from theoretical performance. Minimizing the mass of this component can be difficult considering it is not a simple pin connection 20, as compliant beam 14 should also be able to rotate freely about its longitudinal axis. As depicted in FIG. 2, $W_3$ is established as the weight of this component, and $M_3$ is the moment created by any center-of-mass offset from pin connection 20. The virtual work model can then be solved for the force output as a function of beam properties, link dimensions, and angle of deflection.

For the horizontal model, $$F_{out} = \frac{\gamma^2 K_\theta \frac{EI}{r_2^2}\theta_2 - W_3\cos\theta_2 - \frac{M_3}{r_3}}{\sin\theta_2 - \sin\theta_3} \tag{2}$$

For the vertical model, $$F_{out} = \frac{W_3\cos\theta_2\sin\theta_2 - \left(\gamma^2 K_\theta \frac{EI}{r_2^2}\theta_2\right)\cos\theta_3 + \frac{M_3}{r_3}\cos\theta_2}{\cos\theta_3\sin\theta_2 - \frac{r_2}{r_2^2}\cos\theta_2\sin\theta_2} \tag{3}$$

$W_3$ and $M_3$ respectively are pin connection's 20 weight and moment contribution due to offset center of gravity. These models were produced using virtual work analysis. They provide roughly constant-force outputs as device 10 is compressed.

Beam's 14 bending stiffness about a non-principal stiffness axis can be calculated according to Mohr's circle. For beam 14 undergoing a rotation $\Gamma$ about its longitudinal axis, the following values do not change.

$$\bar{I} = \frac{I_{yy} + I_{zz}}{2} \tag{4}$$

$$I_R = \frac{I_{yy} - I_{zz}}{2} \tag{5}$$

With beam 14 always constrained to bend about the Z-axis, the new second moment of area following beam 14 rotation can be calculated as follows:

$$I_{zz}' = \bar{I} - I_R \cos(2\Gamma) \tag{6}$$

Equations 2 and 3 relate the force output of device 10. The variables are second moment of area I, and joint angles $\theta_2$ and $\theta_3$. Changes in second moment of area are a function of beam 14 rotation $\Gamma$ and aspect ratio.

Figure 3:
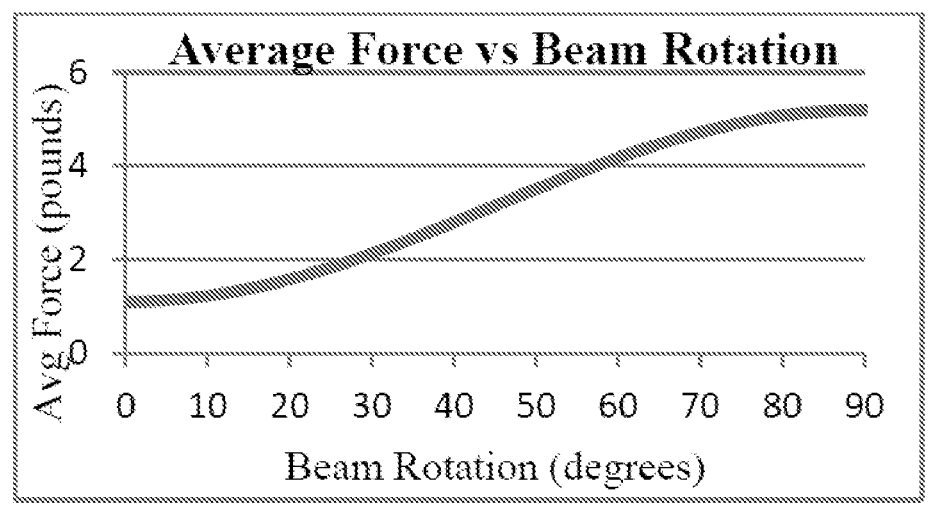
FIG. 3 is a graph depicting a theoretical force output bandwidth.

In certain embodiments, the current invention maximizes constant-force properties as a function of link 26 length from $0° \leq \theta_2 \leq 40°$. Pseudo-rigid link 26A and 26B lengths were selected to minimize the standard deviation of force outputs while maintaining the desired average output. Theoretical force output bandwidth is depicted in FIG. 3.

The present invention offers a theoretical 400% increase in force output through 90 degrees of beam 14 rotation. This is the result of beam's 14 cross-section having a 2:1 aspect ratio. It is possible to increase force bandwidth with a higher beam 14 aspect ratio.

Figure 4A:
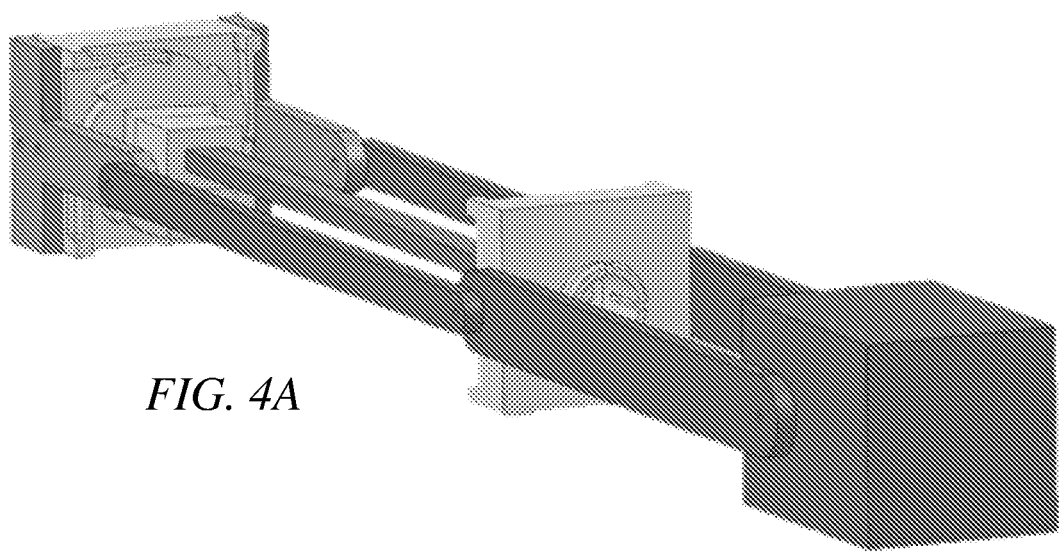
FIG. 4A is a perspective view of compliant CFM, according to an embodiment of the current invention that that uses a compliant ratchet system to enact beam rotation.
Figure 4B:
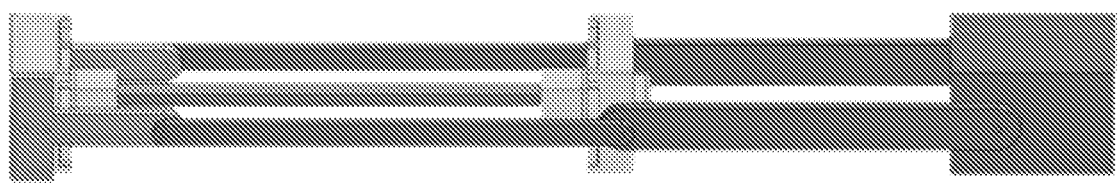
FIG. 4B is a side view of the compliant CFM of FIG. 4A.

A mechanical prototype relying on a compliant ratchet system 28 to enact beam 14 rotation is depicted in FIGS. 4A-4B. Device 10 utilizes rigid links 16A-D to hold compliant beam's 14 direction of bending constant. First rigid links 16A and 16B are pinned at a point described by the PRBM. If unconstrained, the fixed-free beam tip 18 would follow approximately the same circular path as rigid links 16A-D.

By increasing or decreasing the stiffness of compliant mechanism 10, mechanism's 10 resistance to linear motion can be actively adjusted. This is accomplished by rotating one or more flexible members along their longitudinal axis while constraining them to their initial axis/plane of bending. This corresponds to a change in second moment of area that increases or decreases the stiffness of mechanism 10. In the case of compliant constant-force devices 10, this rotation relates directly to a change in output force. Flexural pivots can be rotated in the same way to keep a system statically balanced in various positions. Compliant mechanism 10 designs utilizing beam 14 rotation in this manner allow for adjustment to a wide range of force levels, and also for continuous adjustment under computer control.

It is possible to adjust compliant mechanisms 10 in a way that directly affects their output force. This adjustment can be made either mechanically or electronically. Several applications present themselves. For example, constant-force devices, such as those used in robotic end effectors, become highly adjustable with the option of improving constant-force properties under computer control. Robotic armatures could also employ this system in their joints to maintain static balance in a wide range of positions, improving power efficiency.

EXAMPLE

Figure 5:
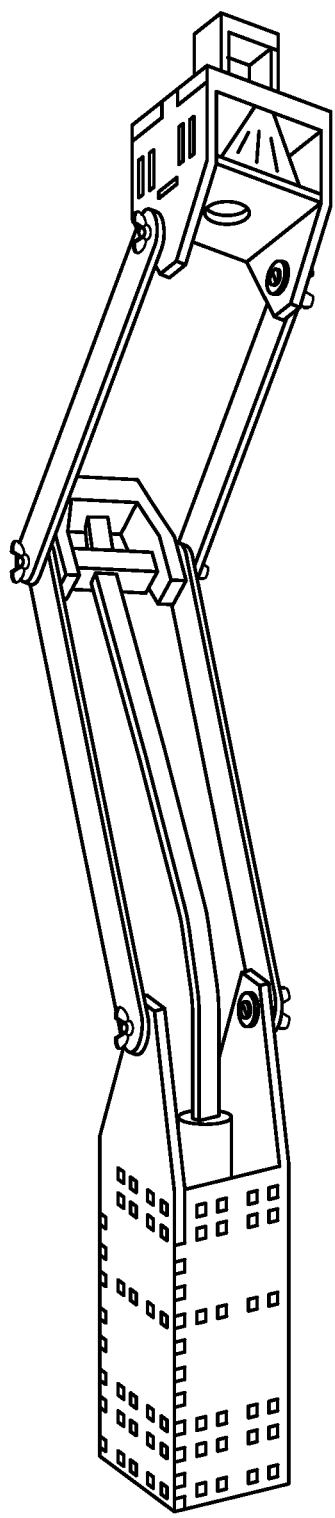
FIG. 5 is a photograph depicting a prototype created in accordance with an embodiment of the invention

While a purely mechanical implementation of beam 14 rotation maintains simplicity, computerized control allows for precise adjustment along a continuous range of force outputs. An exemplary design depicted in FIG. 5 uses a stepper motor to enact beam rotation at the fixed base 12. It is assumed that the unconstrained beam tip 18 follows rotation Γ at the fixed base 12.

The bulk of the apparatus houses a NEMA 17 stepper motor with a 99.05:1 planetary gearbox. This motor setup relates a 0.01817° step interval for high-resolution adjustment of beam rotation Γ.

Figure 6:
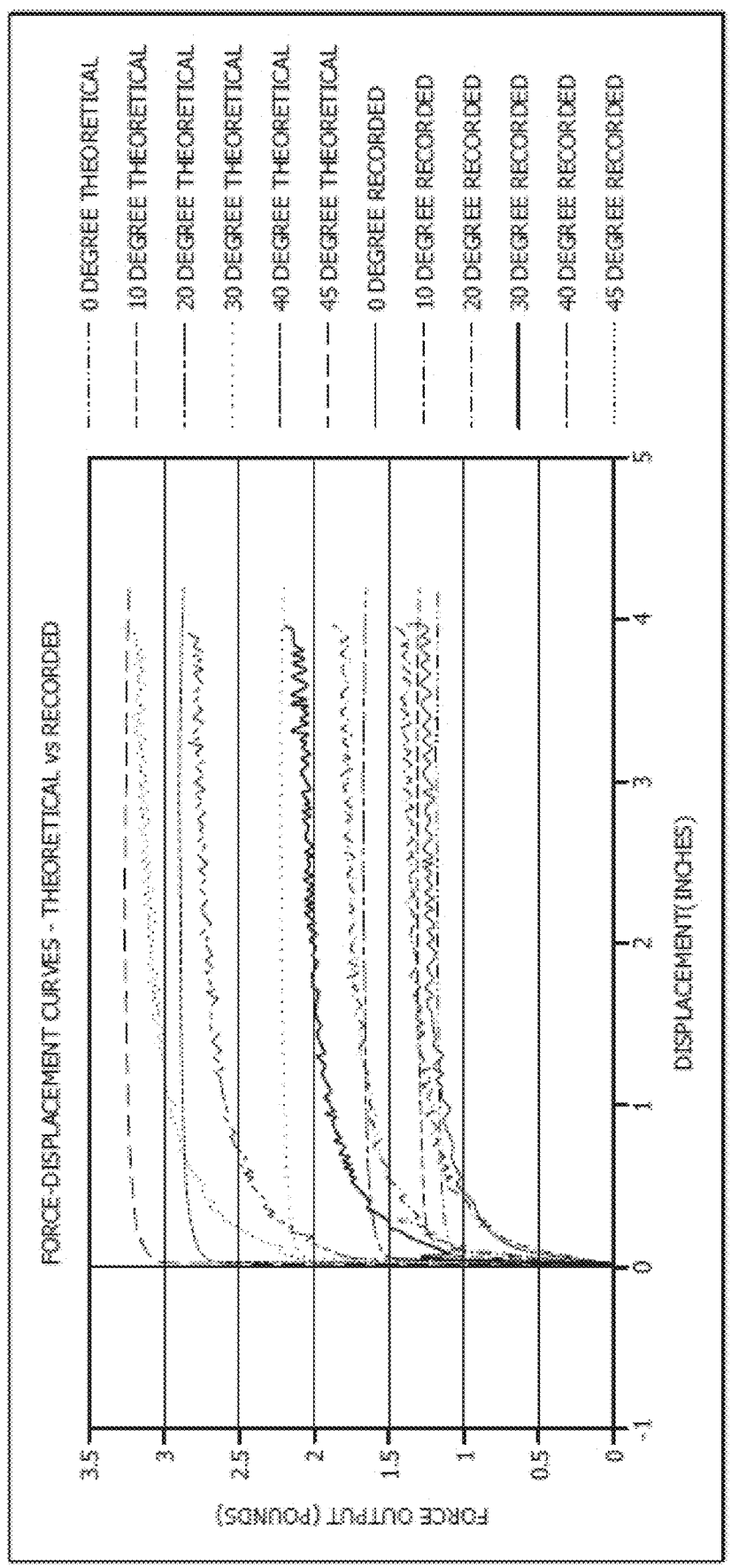
FIG. 6 is a graph depicting recorded force-displacement curves compared to theoretical constant-force performance at several rotational settings.

The results provided in FIG. 6 were obtained with displacement-controlled force measurement. A tensile testing machine was fitted with a 50-pound strain gauge load cell and a zero-balance error of 1%. Each rotational adjustment produced a corresponding force increase in line with the theoretical model. Ultimately, zero-balance error correction of 1.8 pounds was applied uniformly to the data shown in FIG. 6.

Using materials having a higher stiffness would yield results closely aligned with those obtained through the theoretical model. For example, a steel compliant beam 14 would allow for a much higher aspect ratio and avoid issues arising from stress relaxation, creep, and plastic deformation. A higher beam 14 aspect ratio would increase force bandwidth and take full advantage of a high-resolution actuator.

Glossary of Claim Terms

Compliant: This term is used herein to refer a flexible mechanism transferring an input motion, energy, force, or displacement to another point in the mechanism via elastic body deformation. A compliant mechanism gains at least a portion of its mobility through deflection of its flexible components.

Crank-slider mechanism: This term is used herein to refer to a system of mechanical parts working together to transition between linear motion and rotating motion.

Initial axis/plane of bending: This term is used herein to refer to the plane within which the crank-slider mechanism undergoes deformation. When the beam is rotated about its longitudinal axis, the beam still deforms/bends in the same plane.

Joint: This term is used herein to refer to the point or structure where two components of a system join but are still able to rotate relative to each other.

Linearly fixed: This term is used herein to refer to a stationary position of a component relative to moving in the x-, y-, and z-axes. For example, an end of a link can be fixed in place, while the remainder of the link can rotate about that fixed point and/or rotate along its longitudinal axis. That fixed end, however, does not move.

Load-adjustable: This term is used herein to refer to the ability to alter a capacity of slider to be used in the underlying crank-slider mechanism. This is accomplished by being able to alter the constant output force exerted within the system.

Slider: This term is used herein to refer to the prismatic joint (e.g., piston) that undergoes linear movement as a result of actuation of the crank in the underlying crank-slider mechanism.

X-axis: This term is used herein to refer to the horizontal axis of a system of coordinates. However, it can be understood and is contemplated herein that this is a relative term dependent on the orientation of the system. The term "x-axis" is used to indicate the horizontal axis as depicted in FIGS. 1-2. However, if the system is angled in any way, the "x-axis" can be angled in the same way, for example, to indicate a similar path of travel of the slider.

Y-axis: This term is used herein to refer to the vertical axis of a system of coordinates. However, it can be understood and is contemplated herein that this is a relative term dependent on the orientation of the system. The term "y-axis" is used to indicate the vertical axis as depicted in FIGS. 1-2. However, if the system is angled in any way, the "y-axis" can be angled in the same way, for example, to indicate a similar path of travel of the joint.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A compliant, load-adjustable constant-force crank-slider mechanism, comprising:
    a compliant beam having a first end coupled to a rotation mechanism and a second end coupled to a joint connected to a first end of a link;
    the link having a second end opposite the first end, the second end coupled to a slider, wherein the compliant beam is biased toward a stable position and, upon being unstable, outputs a constant force to return to the stable position;
    wherein the rotation mechanism is configured to rotate the compliant beam about its longitudinal axis, thereby altering the constant force; and
    wherein, upon rotation of the compliant beam, the crank slider-mechanism is constrained to its initial axis of bending, such that the slider traverses along an x-axis during compression and decompression of the crank-slider mechanism.

2. A compliant, load-adjustable constant-force crank-slider mechanism as in claim 1,
    wherein the rotation mechanism is a stepper motor that rotates the compliant beam about its longitudinal axis.

3. A compliant, load-adjustable constant-force crank-slider mechanism as in claim 1,
    wherein the rotation mechanism is a compliant ratchet system that rotates the compliant beam about its longitudinal axis.

4. A compliant, load-adjustable constant-force crank-slider mechanism of claim 1, further including:

a support member having a first end coupled to a base and a second end coupled to the joint, such that the support member is parallel to the compliant beam when the crank-slider mechanism is decompressed, the base configured to secure at least a portion of the rotation mechanism therein; and a torsional spring disposed at the first end of the support member, such that the support member is rotatable about the torsional spring, wherein the torsional spring is biased toward a stable position and upon being unstable, outputs a constant force to return to the stable position, wherein the stable position of the torsional spring is a state of expansion, such that upon compression of the crank-slider mechanism, the constant force is outputted to expand the crank-slider mechanism.

5. A compliant, load-adjustable constant-force crank-slider mechanism as in claim 4, wherein the torsional spring is adjustable.

6. A compliant, load-adjustable constant-force crank-slider mechanism as in claim 1, wherein the joint is a pin connection.

7. A compliant, load-adjustable constant-force crank-slider mechanism as in claim 1, wherein the compliant beam and the link are flexible.

8. A compliant, load-adjustable constant-force crank-slider mechanism as in claim 1, wherein the stable position of the compliant beam is a state of expansion of the crank-slider mechanism, such that upon compression of the crank-slider mechanism, the constant force of the compliant beam is outputted to expand the crank-slider mechanism.

9. A compliant, load-adjustable constant-force crank-slider mechanism as in claim 1 wherein an angle of elastic deflection of the compliant beam increases as the crank-slider mechanism compresses.

10. A compliant, load-adjustable constant-force crank-slider mechanism as in claim 1, wherein the compliant beam is freely rotatable about its longitudinal axis.

11. A compliant, load-adjustable constant-force crank-slider mechanism of claim 1, wherein a cross-section the compliant beam has an aspect ratio of about 2:1.

12. A compliant, load-adjustable constant-force crank-slider mechanism, comprising:

a compliant beam having a first end coupled to a rotation mechanism and a second end coupled to a joint connected to a first end of a link;

the link having a second end opposite the first end, the second end coupled to a slider, wherein the compliant beam is biased toward a stable position and, upon being unstable, outputs a constant force to return to the stable position;

a support member disposed parallel to the compliant beam when the compliant beam is in the stable position, the support member having a second end coupled to the joint and a first end coupled to a base;

the base configured to secure at least a portion of the rotation mechanism therein;

wherein the rotation mechanism is configured to rotate the compliant beam about its longitudinal axis, thereby altering the constant force; and wherein, the support member constrains the crank slider-mechanism to its initial axis of bending, such that the slider traverses along an x-axis during compression and decompression of the crank-slider mechanism.

13. A compliant, load-adjustable constant-force crank-slider mechanism as in claim 12, wherein a cross-section of the compliant beam has an aspect ratio of about 2:1.

14. A compliant, load-adjustable constant-force crank-slider mechanism as in claim 12, wherein the compliant beam is linearly fixed to the rotation mechanism.

15. A compliant, load-adjustable constant-force crank-slider mechanism as in claim 12, further comprising:

a torsional spring disposed at the first end of the support member, such that the support member is rotatable about the torsional spring, wherein the torsional spring is biased toward a stable position and upon being unstable, outputs a constant force to return to the stable position, wherein the stable position of the torsional spring is a state of expansion, such that upon compression of the crank-slider mechanism, the constant force is outputted to expand the crank-slider mechanism.

16. A compliant, load-adjustable constant-force crank-slider mechanism as in claim 12, wherein the rotation mechanism is a stepper motor that rotates the compliant beam about its longitudinal axis.

17. A compliant, load-adjustable constant-force crank-slider mechanism as in claim 12 wherein an angle of elastic deflection of the compliant beam increases as the crank-slider mechanism compresses.

18. A compliant, load-adjustable constant-force crank-slider mechanism as in claim 12, wherein the link is a second compliant beam.

19. A compliant, load-adjustable constant-force crank-slider mechanism, comprising:

a compliant beam having a first end coupled to a stepper motor and a second end coupled to a joint connected to a first end of a link;

the link having a second end opposite the first end, the second end coupled to a slider, wherein the compliant beam is biased toward a stable position and, upon being unstable, outputs a constant force to return to the stable position, wherein the stepper motor is configured to rotate the compliant beam about its longitudinal axis, thereby altering the constant force, and wherein, upon rotation of the compliant beam, the crank slider-mechanism is constrained to its initial axis of bending, such that the slider traverses along an x-axis during compression and decompression of the crank-slider mechanism.

20. A compliant, load-adjustable constant-force crank-slider mechanism as in claim 19, further comprising:

a support member having a first end coupled to a base and a second end coupled to the joint, such that the support member is parallel to the compliant beam when the crank-slider mechanism is decompressed, the base configured to secure at least a portion of the rotation mechanism therein; and a torsional spring disposed at the first end of the support member, such that the support member is rotatable about the torsional spring, wherein the torsional spring is biased toward a stable position and upon being unstable, outputs a constant force to return to the stable position, wherein the stable position of the torsional spring is a state of expansion, such that upon compression of the crank-slider mechanism, the constant force is outputted to expand the crank-slider mechanism.

* * * * *